(12) United States Patent
Maarek et al.

(10) Patent No.: US 11,070,501 B2
(45) Date of Patent: Jul. 20, 2021

(54) COMPUTERIZED SYSTEM AND METHOD FOR AUTOMATICALLY DETERMINING AND PROVIDING DIGITAL CONTENT WITHIN AN ELECTRONIC COMMUNICATION SYSTEM

(71) Applicant: VERIZON MEDIA INC., New York, NY (US)

(72) Inventors: Yoelle Maarek, Haifa (IL); Ido Guy, Haifa (IL); Dan Pelleg, Haifa (IL); Idan Szpektor, Kfar Saba (IL); Alexander Nus, Rishon LeZion (IL); Jeffrey Bonforte, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 560 days.

(21) Appl. No.: 15/421,033

(22) Filed: Jan. 31, 2017

(65) Prior Publication Data

US 2018/0219814 A1    Aug. 2, 2018

(51) Int. Cl.
| | | |
|---|---|---|
| H04L 12/58 | (2006.01) | |
| G06K 9/00 | (2006.01) | |
| G06Q 50/00 | (2012.01) | |
| G06F 16/583 | (2019.01) | |

(52) U.S. Cl.
CPC .......... *H04L 51/08* (2013.01); *G06F 16/583* (2019.01); *G06K 9/00677* (2013.01); *G06Q 50/01* (2013.01); *H04L 51/10* (2013.01)

(58) Field of Classification Search
CPC .... H04L 51/08; G06F 16/583; G06K 9/00677
See application file for complete search history.

(56) References Cited

U.S. PATENT DOCUMENTS

2012/0076423 A1\* 3/2012 Tang .................... G06K 9/6211
382/203
2014/0372419 A1\* 12/2014 Li ....................... G06F 16/9038
707/723

(Continued)

*Primary Examiner* — Hitesh Patel
*Assistant Examiner* — Eui H Kim
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. A novel, computerized framework for automatically identifying and recommending socially-engaging photos to their creators for sharing is provided. Execution of the disclosed framework turns a tedious manual chore into an automated, software-driven process. The disclosed framework utilizes a novel, computerized learn-to-rank (LTR) algorithm for identifying the most engaging, socially driven photos by: (a) grouping near-duplicate photos; (b) selecting a representative photo for sharing per group; and (c) ranking of the groups by their likelihood to contain a "shareable" photo.

20 Claims, 8 Drawing Sheets

(56) References Cited

U.S. PATENT DOCUMENTS

| | | | |
|---|---|---|---|
| 2015/0334142 A1* | 11/2015 | Gottlieb | H04L 65/403 |
| | | | 715/753 |
| 2016/0042249 A1* | 2/2016 | Babenko | G06K 9/00744 |
| | | | 382/170 |
| 2016/0283483 A1* | 9/2016 | Jiang | G06F 16/248 |
| 2017/0091208 A1* | 3/2017 | Quan | G06F 3/0482 |
| 2017/0180276 A1* | 6/2017 | Gershony | H04L 51/02 |
| 2017/0192965 A1* | 7/2017 | Loscalzo | G06T 11/60 |
| 2017/0235768 A1* | 8/2017 | Amrutkar | G06F 16/5866 |
| | | | 707/722 |

* cited by examiner

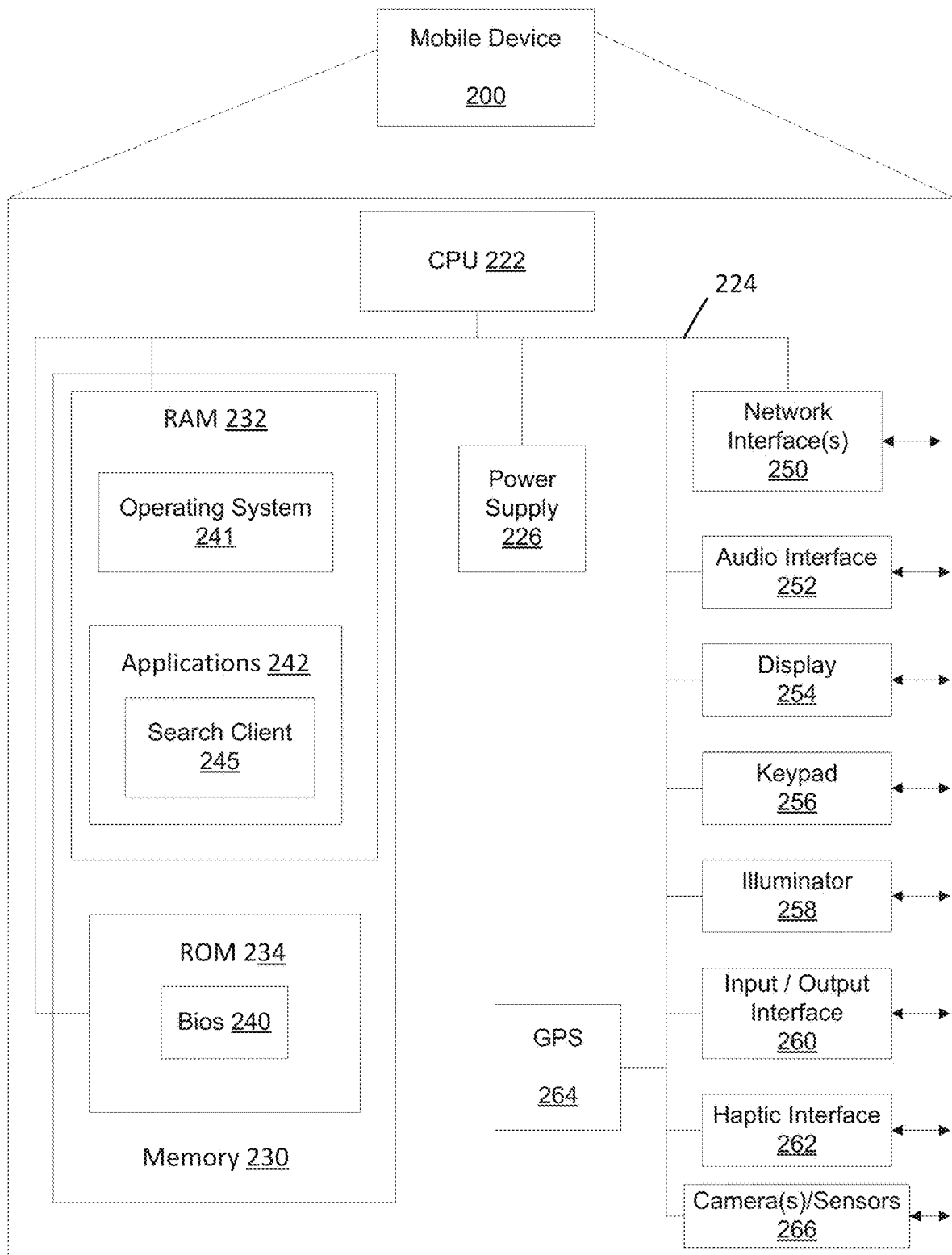

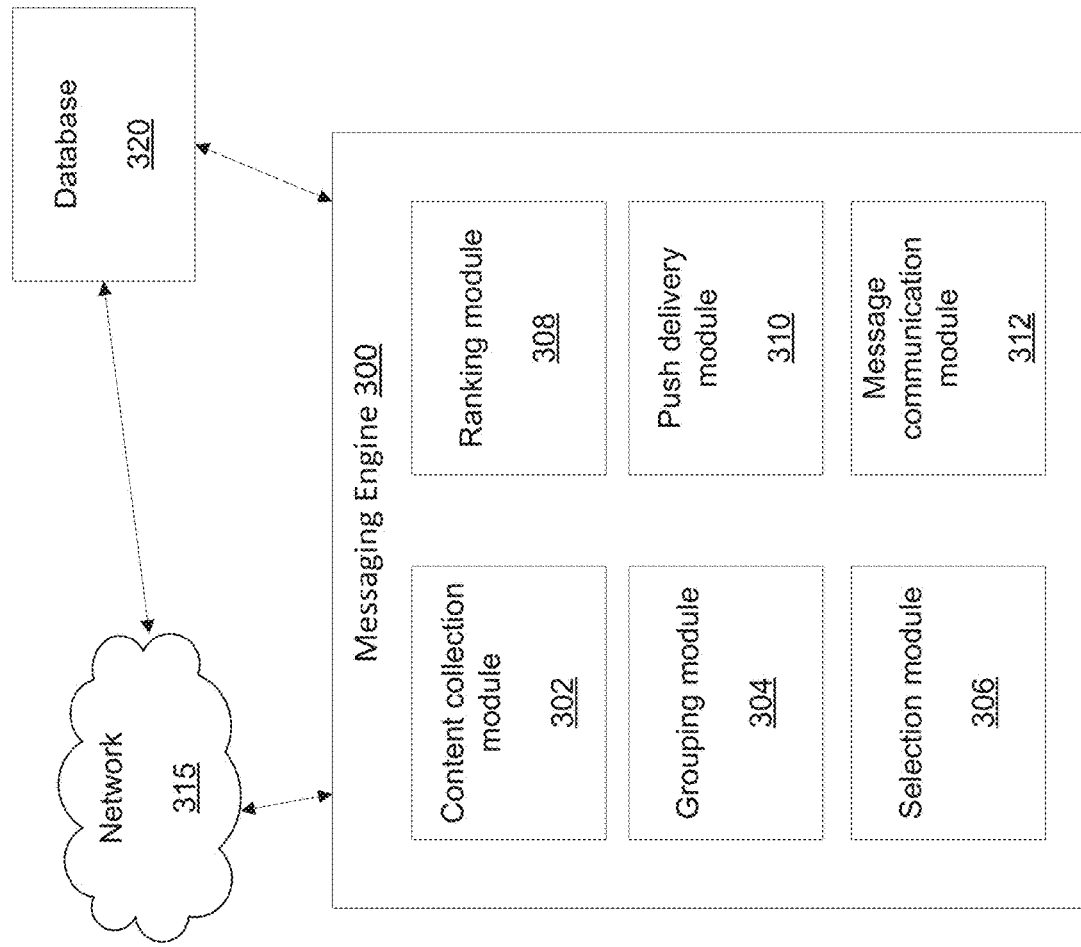

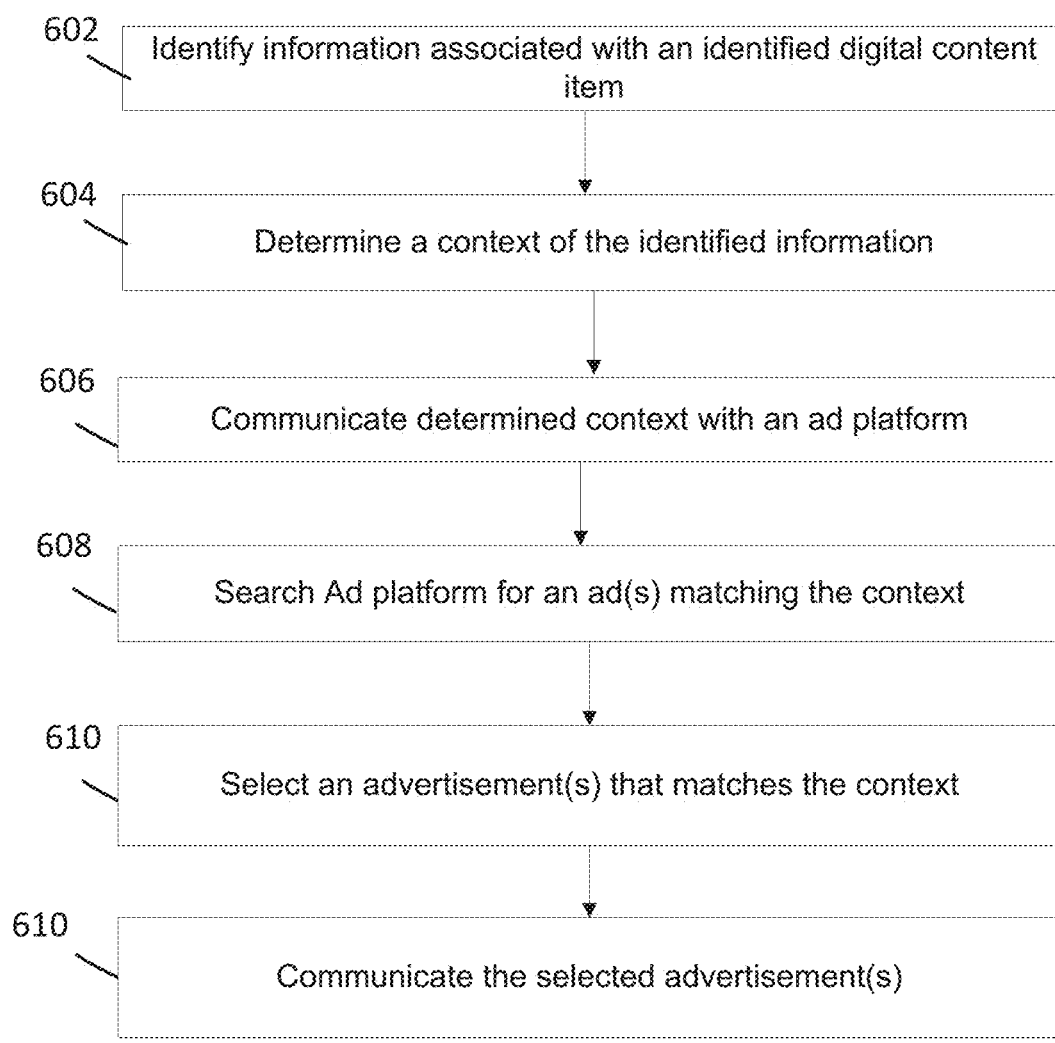

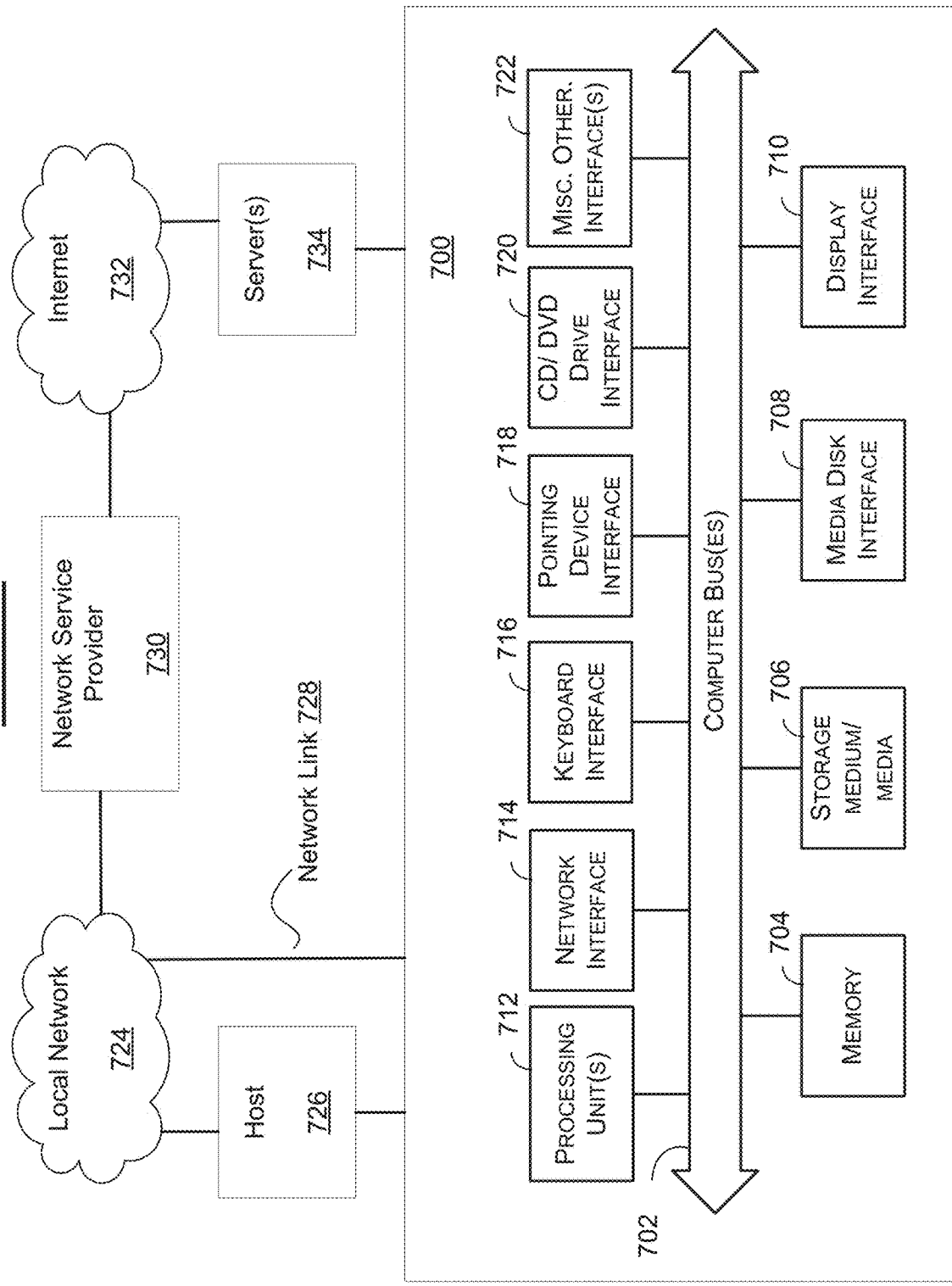

COMPUTERIZED SYSTEM AND METHOD FOR AUTOMATICALLY DETERMINING AND PROVIDING DIGITAL CONTENT WITHIN AN ELECTRONIC COMMUNICATION SYSTEM

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer devices, systems and/or platforms by modifying the capabilities and providing non-native functionality to such devices, systems and/or platforms for a novel and improved framework for automatically analyzing digital content files and determining which files to communicate to other users based on a determined shareability value of each file, and communicating those determined files over a network via an electronic communication platform.

SUMMARY

In today's modern world, users are almost exclusively utilizing their mobile devices to take an ever-growing number of photos every day. These photos are uploaded to data stores associated with messaging systems, cloud-based systems, and social sites, such as, for example, Tumblr®, Instagram®, Facebook® and Flickr®, many times automatically. Yet, the portion of these uploaded photos being shared is low, and declining. Deciding which photo to share takes considerable time and attention, and many users would rather forfeit the social interaction and engagement than sift through their high number of uploaded photos.

The instant disclosure provides a novel, computerized framework addressing these concerns, among others, by providing the disclosed systems and methods for automatically analyzing, identifying, and then recommending socially-engaging photos, to their creators, for public or private sharing to other users. Execution of the disclosed systems and methods turns a tedious and often ignored manual chore into a quick, automated and software-driven process. As discussed in more detail below, the disclosed systems and methods utilize a novel, computerized learn-to-rank (LTR) algorithm (referred to interchangeably as a "three-step algorithm") for identifying the most engaging, socially driven photos by, inter alia: (a) grouping near-duplicate photos; (b) selecting of a representative photo for sharing per group; and (c) ranking of the groups by their likelihood to contain a "shareable" photo.

For purposes of this disclosure, the term "shareable" refers to, as would be understood by those of skill in the art, a value, metric or other type of measurement that indicates or provides an assessment of how likely or interested another private and/or public user would be in receiving or viewing a photo from a user. Such assessment is based on the user sharing the photo with such users as a result of the disclosed systems and methods. "Sharing," as understood by those of skill in the art, is understood to involve changing the access control of the item to be less restrictive and allow a larger (or alternative) audience to view (or save, download, upload, edit, post, reblog, and the like) the photo. For example, changing the permissions of a photo from private (e.g., readable by the owner only) to public (e.g., readable by any other user). As discussed in more detail below, such shareability is determined via implementation of the three-step algorithm by the disclosed systems and methods on a collection of photos (e.g., a user's photo collection, a collection of photos hosted by a site, located on the internet, and the like).

While the discussion herein will focus on analyzing, identifying and recommending digital photos (or images, understood as digital image files), it should not be construed as limiting, as any type of digital content can be recommended for sharing by the disclosed systems and methods. For example, such digital content can include, but is not limited to, video, text, audio, short form videos (e.g., graphics interchange files (GIFs)) and/or any other type of known or to be known multi-media item or object. One of ordinary skill in the art would understand that any type of known or to be known digital content item could be analyzed by the three-step algorithm and identified as a content item to be communicated to other users.

As evidenced from the discussion herein, the disclosed systems and methods provide a computerized framework that assists social-media impaired users in sharing interesting content by surfacing photos that the user did not identify, remember or acknowledge as shareable, which increases message engagement by receiving users (of the messages that include the identified photo), as well as the social presence of the sending user, in that inclusion of engaging photos within their messages leads to increased click-through rates (CTR) of their messages and a following by other users that acknowledge, or come to learn, that the user has a perspective that is necessary to follow online.

Accordingly, in one or more embodiments, a method is disclosed for a novel, computerized framework for automatically analyzing a collection of digital content, and identifying and recommending a digital content item to users based on a determination of how shareable the digital content item is. The disclosed recommendations involve push mechanisms executed within the framework of the electronic communication platform (e.g., mail, messengers and social media platforms, for example) that encourage the user to include the digital content within a message to another user. As discussed in more detail below, in some embodiments, the push mechanisms can be configured to specific communication platforms, and in some embodiments, the push mechanisms can be configured as general mechanism that can execute across a variety of communication platform types.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically analyzing digital content files and determining which files to communicate to other users based on a determined shareability value of each file, and communicating those determined files via an electronic communication platform.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating an example of client device in accordance with some embodiments of the present disclosure;

FIG. 3 is a schematic block diagram illustrating components of an exemplary system in accordance with embodiments of the present disclosure;

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
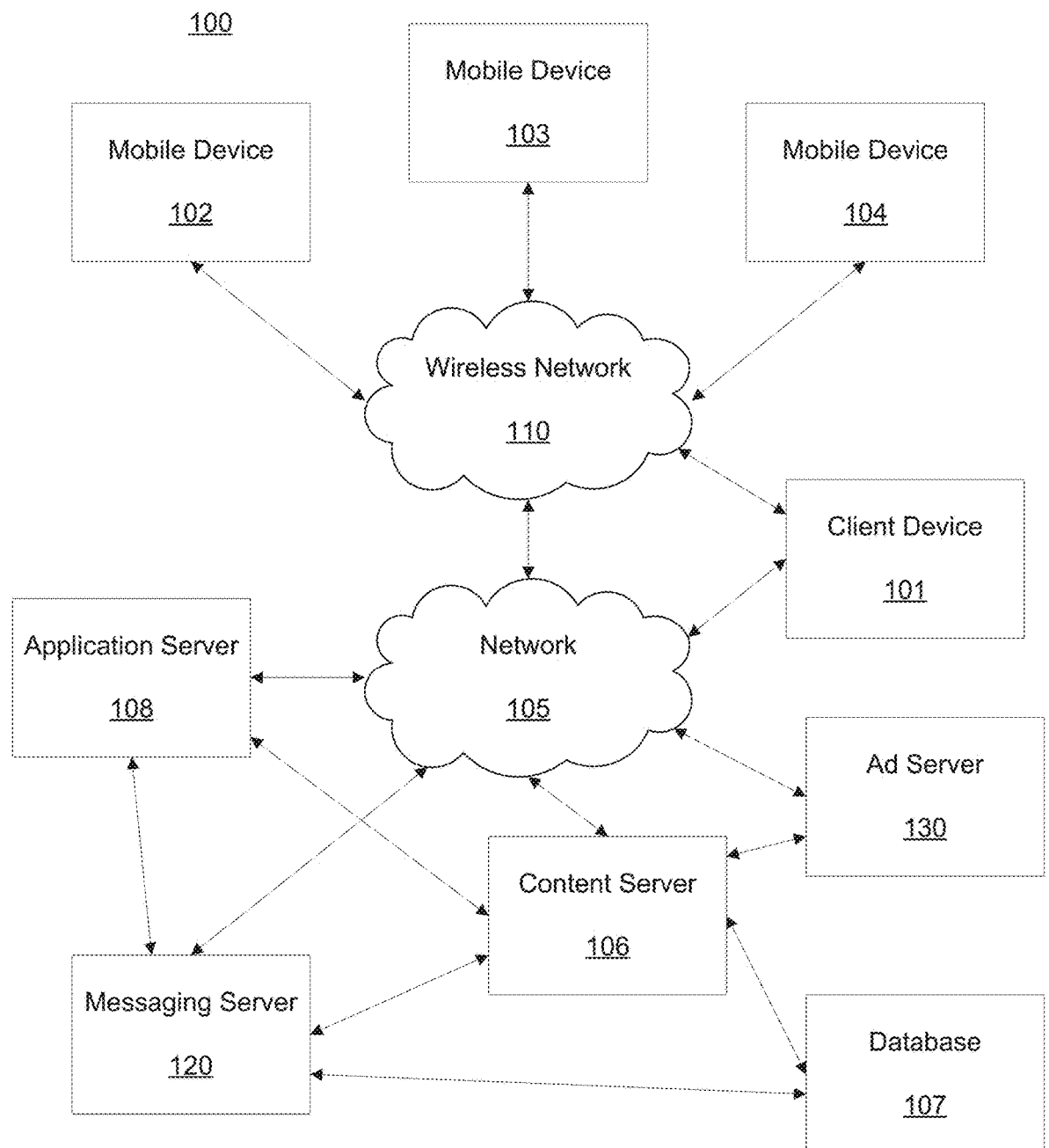
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11 b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram®, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. By way of background, digital photography, as enabled by smartphones, started a revolution in the way people take photos and interact through them. Prior to smart-phones and high-quality phone cameras, people preferred looking at photos together or in person over viewing them on a computer, and e-mail was the main vehicle for digital sharing. When phone cameras and image uploading and sharing became ubiquitous, users started taking many ordinary and spontaneous photos of family, friends, and travel, for example. The phone became a tool for creating and maintaining social relationships, sharing experiences (personal or collective), and for self-expression and presentation. Automatic image uploading from mobile phones to social media, such as Facebook® and Flickr®, or cloud storage (e.g. Google Drive® and Dropbox®) soared in popularity. And, while some use the cloud to share all their photos (e.g., set their default sharing to "public"), many others upload their photos privately as a means for backup or limited sharing with just friends or family.

This technological change led to new challenges with respect to photo sharing. First, due to volume, many of the uploaded photos remain part of a private repository because users do not have the time or state-of-mind to go over the photos they took and decide which should be shared. Second, when users do go over their photos, e.g. once a day, a week, or a month, they face a daunting task. While some users overcome it with a "share-all" policy, even they would welcome software to help save their followers from a deluge of undesired photos.

For example, analysis of photos uploaded from smart phones to Flickr® in 2015 revealed that the total number of uploaded photos has been on the rise, fueled by increasing popularity of mobile photos. However, the portion of public photos has been on a constant decline—only 5% of mobile photos on Flickr were shared in 2015, compared to over 40% in 2008.

To address these challenges, the instant disclosure provides a novel framework for performing the task of automatically recommending photos from a photo collection (e.g., a user's private collection on a photo sharing site or those photos saved on their mobile devices) for the purpose of public sharing. As discussed herein in more detail below, photos are analyzed (e.g., in order to identified photo parameters, characteristics, aesthetics, content and creator identity, for example), and based on such analysis, each photo is assessed by their likelihood to be shared. The photos having the highest value of likelihood to be shared are to be recommended to the user for the actual sharing act.

As evidenced by the disclosure herein, such novel tasks are by no means a simple one or one readily performed by a generic device or simple or fundamental organization of computational tasks. Studies have revealed that human considerations when selecting photos for sharing involve concerns about social disclosure, as well as factors that traditionally influence privacy management, like family concerns or social support. As discussed herein, these considerations are quantified and modeled, and leveraged in order to identify differences between shareable and non-shareable photos using the computerized, automatic image analysis techniques discussed herein.

It is understood by those of even moderate skill, and even those users that simply are end-users of a mobile device (e.g., smartphone), that groups (or a series or sequence) of photos are often taken on the same object or scene, which are referred to as "near-duplicates." Users typically share at most one of the photos in each such group. With this understanding, the disclosed systems and methods, therefore, perform an automated, computational analysis and evaluation of the final photo recommendation for sharing under two competing scenarios, in which, either: (a) de-duping is important; or (b) duplicates are acceptable.

To this end, the disclosed systems and methods involve the implementation of a novel, three-step algorithm for the photo sharing recommendation task. As discussed in more detail below, in the first step, the target photo collection is segmented into "near-duplicate" groups. In the second step, the algorithm then ranks the photos in each group by their likelihood to be shared. Finally, in the third step, the groups themselves are ranked by their prospects to contain shareable photos. If duplicates are unwanted, only the top ranking photo from each group is presented to the user. Otherwise, several (or all) photos from each group are shown, ordered by the groups' ranking on top of their in-group ranking.

As discussed herein, according to some embodiments of the instant disclosure, the disclosed systems and methods provide such novel framework as a series of sub-tasks. In some embodiments, the disclosed systems and methods implement group segmentation as a sequential segmentation of the photo collection over time and learn a threshold over similarity functions given a training dataset. In addition, both group ranking and photo ranking within each group are treated as learning to rank (LTR) tasks. The implemented LTR models are trained (e.g., continuously and/or periodically) on a large dataset consisting of daily uploads of smartphone photos, for example, to Flickr®, where a set of photos (e.g., one or many) are then set to be public by the account owner. The goal in the LTR tasks is to rank the public (shared) photos and groups higher compared to the private ones. As discussed below, in some embodiments, features for each photo are derived, determined, or otherwise identified based on the photo's contents, including, but not limited to, a latent vector representation based on a deep-learning network as well as semantic binary derivatives, such as the photo aesthetics. According to some embodiments, group-based features, such as the position of the photo in the group, as well as group statistics, such as average photo aesthetics, can be utilized or form the basis of how shareable a photo is compared to other photos.

As such, photo sharing over the internet with other users is one of the most fundamental activities in social media. Photos are one of the most frequent content types shared (if not the most frequent). There are many ways to upload the photos to the user's account, either manually or automatically. For example, many applications, including for example Facebook®, Flickr®, Tumblr® and Yahoo Mail®, allow a user to (either manually or automatically) upload their photos taken on their smartphone cameras to their account. In order to leverage this plethora of resources resident to such applications and/or accounts, the disclosed systems and methods provide and implement a novel LTR algorithm that quantifies values of how shareable photos are, which, in other words, enables the devices performing the disclosed systems and methods to predict which photos will cause and/or engage users in additional interactions on their devices or over the network. Thus, the disclosed systems and methods determine, derive, select or otherwise identify a set of "shareable" photos from a collection of photos (e.g., the whole or a subset of it—for example, a set comprising a weekly upload of photos) associated with a user's account with the goals of achieving the following: i) pushing to the user the selected photos enabling the user to share at least one selected photo; and ii) automatically promoting only the selected photos to be shared by the application.

Figure 4A:
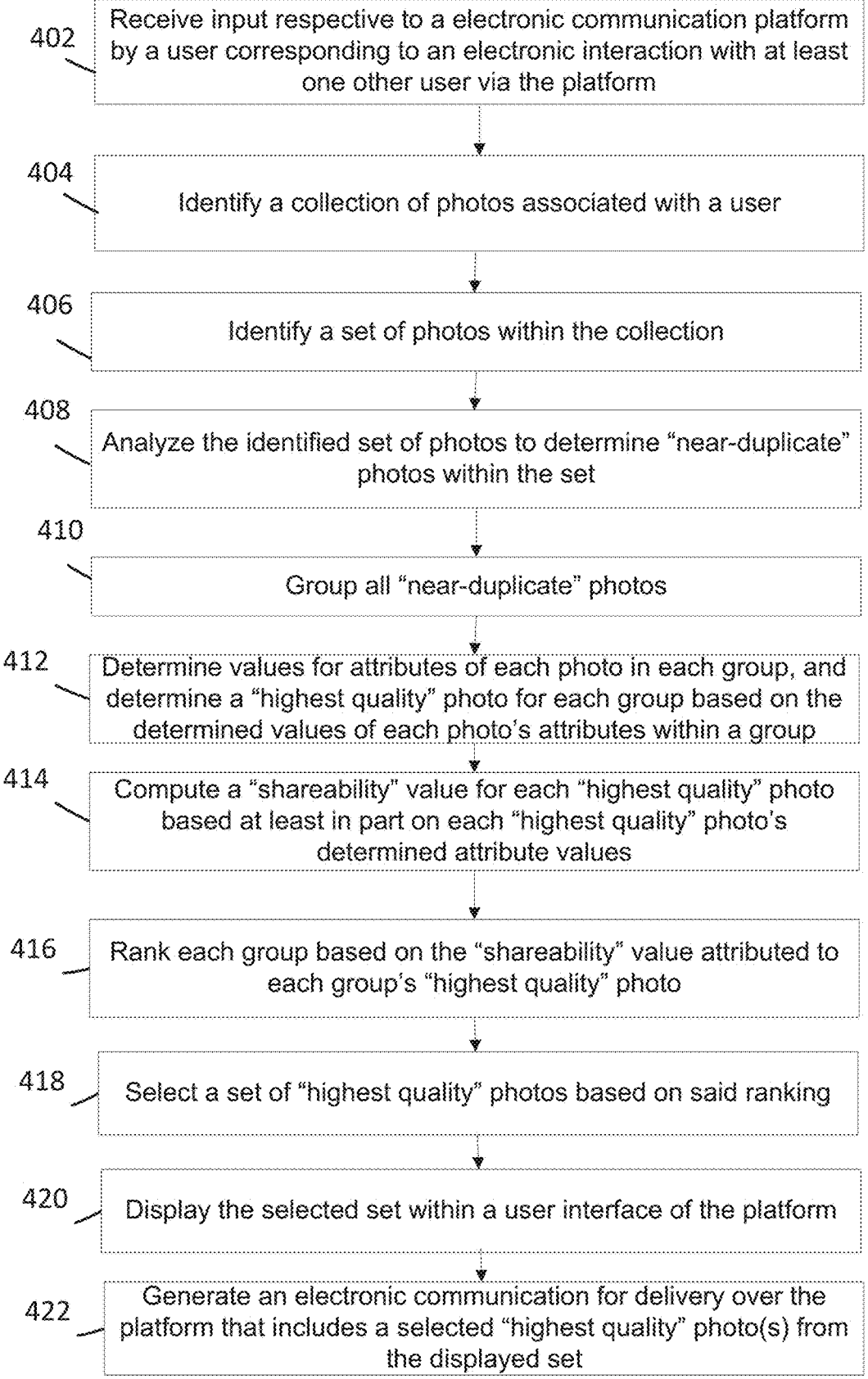
FIGS. 4A-4B are flowcharts illustrating steps performed in accordance with some embodiments of the present disclosure.
Figure 4B:
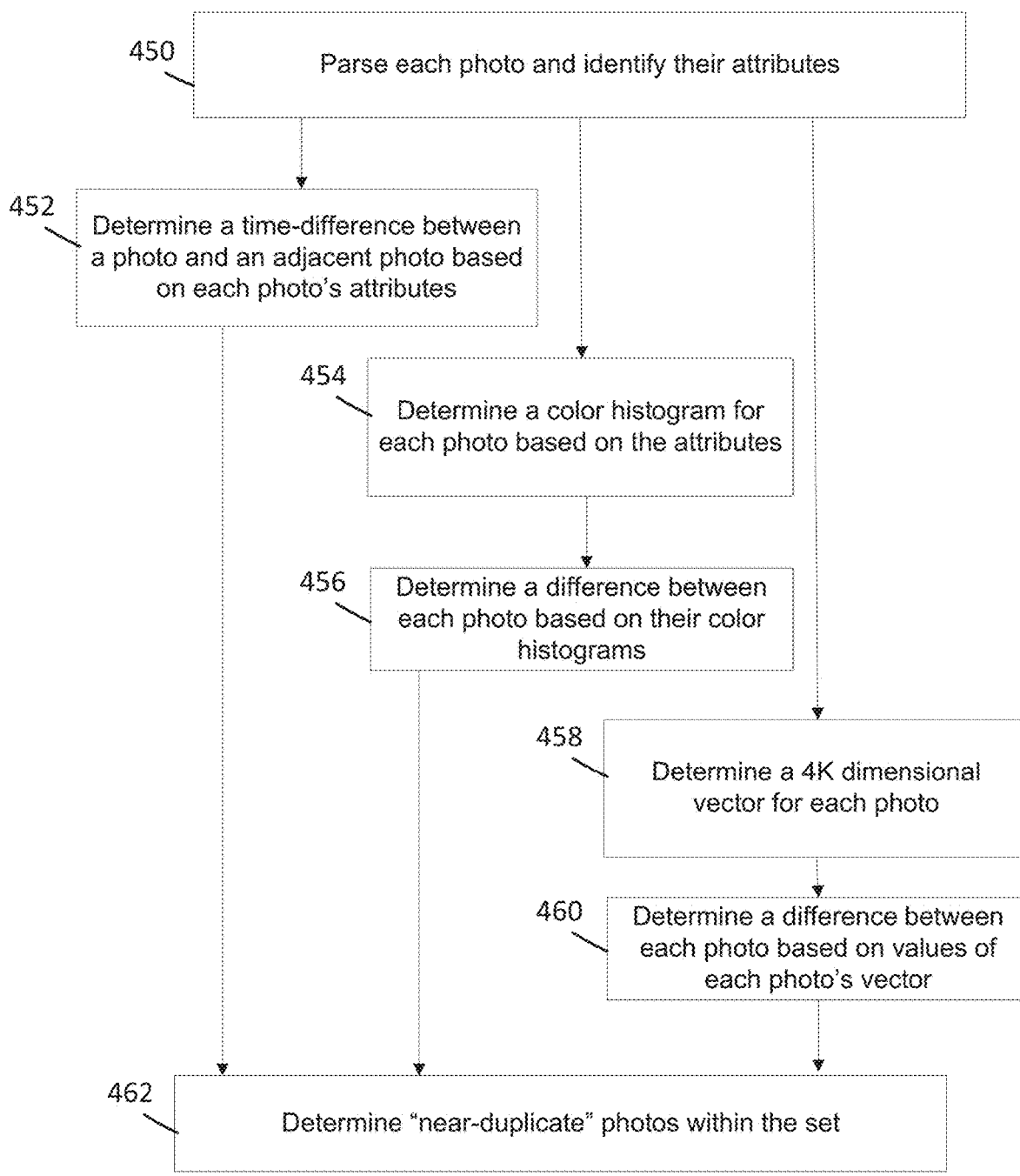
Figure 5:
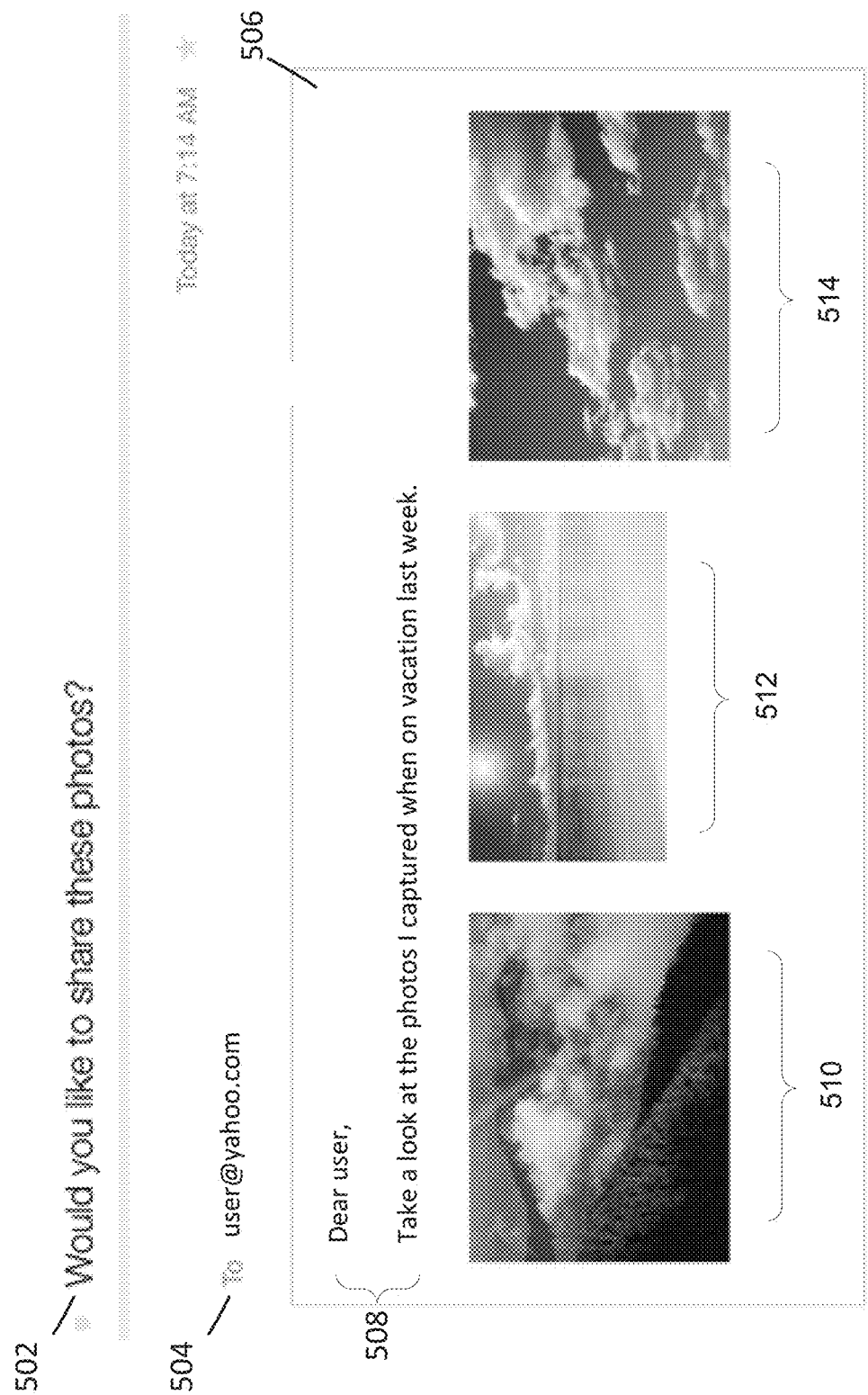
FIG. 5 illustrates non-limiting embodiments of a provided set of digital content items within a communication platform interface according to some embodiments of the present disclosure.

According to embodiments of the instant disclosure, the steps of, among others, analyzing a digital content collection (e.g., photo collection of a user), identifying digital content items (or objects) from the collection, and generating messages that include the identified digital content items can all be performed automatically by the messaging engine 300, as discussed in more detail in relation to FIGS. 3-5. In some embodiments, the automation of these steps, among others, occurs in real-time, or near-real-time, such that as a user captures, downloads or uploads a photo, or drafts a message to another user, for example, these steps are being performed in the background thereby enabling a real-time, personalized reflection of suggestions that are based on the most up-to-date collection of images a user has at his disposal for sharing.

As discussed in more detail below at least in relation to FIG. 6, according to some embodiments, information associated with, derived from, or otherwise identified from, during or as a result of identification and/or communication of a digital content item within a message, as discussed herein, can be used for monetization purposes and targeted advertising when providing, delivering or enabling devices access to such digital content and/or messages. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, messaging server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), Dynamic HyperText Markup Language (DHTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email or messaging platform (e.g., Yahoo!® Mail), a social networking site, a photo sharing site/service (e.g., Tumblr®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like. Likewise, the messaging server 120 may include a device that includes a configuration to provide content via a network to another device.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

In a similar manner as the content server 106, the messaging server 120 may include a device that includes a configuration to provide content via a network to another device. The messaging server 120 can, for example, host a site, service or an associated application, such as, an email or messaging platform (e.g., Yahoo!® Mail), a social networking site, a photo sharing site/service (e.g., Tumblr®), and the like. Additionally, the messaging server 120 can further provide a variety of services similar to those outlined above for the content server 106.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo!® Mail, Yahoo!® Messenger), a photo sharing/user-generated content (UGC) application (e.g., Flickr®, Tumblr®, Instagram® and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or content server 106, messaging server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-5.

FIG. 3 is a block diagram illustrating the components for performing the systems and methods discussed herein. FIG. 3 includes a messaging engine 300, network 315 and database 320. The messaging engine 300 can be a special purpose machine or processor and could be hosted by a messaging server, application server, content server, social networking server, web server, search server, content provider, email service provider, ad server, user's computing device, and the like, or any combination thereof.

According to some embodiments, messaging engine 300 can be embodied as a stand-alone application that executes on a user device. In some embodiments, the messaging engine 300 can function as an application installed on the user's device, and in some embodiments, such application can be a web-based application accessed by the user device over a network. In some embodiments, the messaging engine 300 can be installed as an augmenting script, program or application to another messaging and/or media content hosting/serving application, such as, for example, Yahoo!® Mail, Yahoo!® Messenger, Yahoo!® Search, Flickr®, Tumblr®, Twitter®, Instagram®, SnapChat®, Facebook®, and the like.

The database 320 can be any type of database or memory, and can be associated with a content server on a network (e.g., content server 106, messaging server 120, ad server 130 or application server 108 from FIG. 1) or a user's device (e.g., device 101-104 or device 200 from FIGS. 1-2). Database 320 can comprise, for example, a dataset of content items (associated with a content provider or a user-generated content (UGC) set(s)), electronic messages, device data and associated metadata, and user data and associated user metadata. Such information can be stored in the database 320 independently and/or as a linked or associated dataset. It should be understood that the data (and metadata) in the database 320 can be associated with any type of content, user, device, application, service provider, content provider, or network information and type, and the like, or some combination thereof, whether known or to be known, without departing from the scope of the present disclosure.

The data and metadata of stored electronic messages processed according to the disclosed systems and methods, and stored in database 320, can be any type of message. Examples of such messages can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages can be provided to the messaging engine 300 or accessed by a computer program or device that can access the messages. In some embodiments, the messages can be stored in a database of stored messages 320, which is associated with an email provider, such as Yahoo! Mail®.

Database 320 can also comprise a dataset of data and metadata associated with local and/or network information related to users, devices, services, applications, user-generated content, third party provided content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, user generated content, and the like, or some combination thereof.

According to some embodiments, the user data can also include, for purposes drafting, sending, receiving and/or displaying messages, rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with users that have generated and/or captured or downloaded content and/or content providers, such as, but not limited to, content generating and hosting sites or providers that enable users to search for, send and/or receive, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, and the like). In some embodiments, database 320 can comprise data and metadata associated with such content information from one and/or an assortment of users and/or media hosting sites. In some embodiments, such user and/or content provider information can include, but is not limited to, versions, types and/or capabilities of applications that are resident or accessed by a user device, and/or are capable of being downloaded, executed, accessed or run on user device for purposes of creating, capturing, sending and/or rendering content.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the messaging engine 300, and the database of stored resources 320. Indeed, as illustrated in FIG. 3, the messaging engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as messaging engine 300, and includes content collection module 302, grouping module 304, selection module 306, ranking module 308, push delivery module 310 and message communication module 312. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4A, Process 400 details steps performed in accordance with some embodiments of the present disclosure for identifying and selecting a set of photos from a collection of photos that are to be recommended or promoted for sharing with other users over the internet. As discussed herein, Process 400 details embodiments for implementing the disclosed, novel three-step/LTR algorithm that performs the steps for recommending private photos to be publicly shared. In some embodiments, such recommendation steps can be viewed as a ranking task, where candidate photos are ranked and the top N are presented to the user, which in turn selects some (or all or none) of them for sharing.

According to some embodiments of the instant disclosure, Process 400 involves two recommendation scenarios: (a) the user prefers not to see near-duplicates, only a single exemplar from each scene; or (b) the user does not mind duplicates, as long as shareable photos are ranked according to their determined shareable values. As discussed in detail below, both scenarios are addressed by the messaging engine 300 implementing the LTR algorithm embodied by modules 302-312. As detailed in Process 400 below, first, the messaging engine 300 segments a set of target photos into groups of "near-duplicates", then the messaging engine 300 selects a single representative photo for each group. Next, the messaging engine 300 ranks the groups themselves according to each group's likelihood to contain at least one shareable photo.

According to some embodiments, for generating the final N photos that make up the recommendation list, the messaging engine 300 can perform its next computations based on whether duplicates are to be included in the recommended photo set (or listing). If near-duplicates are unwanted, the top-N groups that were ranked are selected. Then, the representative photo from each group is taken, generating a ranked list of N photos. If de-duping is desired, the recommendation list generated by the messaging engine 300 includes the top K photos from each group (or all photos in an extreme scenario), concatenating them to a single list/set according to the groups' rankings.

In some embodiments, the provided listing or set of recommended photos can be provided as a set of thumbnail images, where a thumbnail image depicts content from a highest ranking photo from a group. Therefore, rather than copies or actual versions of the photos being provided to a user, as illustrated in FIG. 5 and discussed in more detail below, the thumbnail image representation of a selected photo can allow the user to "drill-down" into each group represented by the thumbnail image and browse through that particular group of photos. In some embodiments, even a non-thumbnail image recommended photo can enable a user to "drill-down" in a like manner discussed above.

Steps 402 and 422 of Process 400 are performed by the message communication module 312 of the messaging engine 300; Steps 404-406 are performed by the content collection module 302; Steps 408-410 are performed by the grouping module 304; Steps 412 and 418 are performed by the selection module 306; Step 414-416 are performed by the ranking module 308; and, Steps 420 is performed by the push delivery module 310.

Process 400 begins with Step 402 where an input is received from a user on an electronic communication platform that corresponds to the creation of a message to at least one other user. As discussed above, the electronic communication platform can be any type of known or to be known communication platform or system, for example, Yahoo!Mail®, Yahoo! Messenger®, Facebook®, Twitter®, SnapChat®, Instagram®, Tumblr® and the like. The input, as understood by those of skill in the art, can be related to creating a message on the platform, where such creation can be related to drafting a new message, responding to a message, forwarding a message, and the like.

For example, in Step 402, a user drafts a message to another user by inputting the other user's email address and entering content into the drafted message body. As illustrated in FIG. 5, for example, a user drafts a new message (item 500) to the other user: user@yahoo.com (item 504), and enters the text (item 508) "Dear user, Take a look at the photos I captured when on vacation last week" within the message body (item 506).

In Step 404, a collection of photos associated with the user is identified, and at least one of these photos is to be recommended to the user for inclusion in the drafted message from Step 402, as detailed herein. As discussed above, the photo collection can be associated with a user, service or content provider, a user's device, and the like, or some combination thereof, and can include photos that are user generated content (UGC), web-searched images (e.g., Getty® images or images identified on a network), and the like, or some combination thereof. In some embodiments, the photo collection can be directly associated with the user and/or the provider hosting the platform being used to communicate the message.

For example, if the user is drafting the message using Yahoo! Mail®, then the photo collection identified can be resultant of a search for user photos within a database associated with the user's Yahoo! Mail® account (or, for example, Flickr® account because Yahoo!® and Flickr® are owned by the same entity).

As discussed above, for purposes of simplicity in discussing the disclosed systems and methods, the digital content identified and recommended as a result of Process 400 will be a photo (i.e., an image file); however, it should not be construed as limiting, as one of skill in the art would understand that any type or variety of media files stored in a collection of files, whether known or to be known, can be identified, analyzed, recommended and included in a message according to the disclosed systems and methods, without departing from the scope of the instant disclosure.

In Step 406, a set of photos within the identified collection of photos is identified. In some embodiments, the set of photos can be inclusive of all the photos in the collection, or a subset of the entirety of the collection. For example, the set of photos can be a set that are identified as being taken according to a predetermined time frame, captured, downloaded or received by/from a specific user, associated with a particular physical geographic location, be of a particular quality (e.g., pixel count) or size, have a particular format, and the like, or some combination thereof.

In some embodiments, the set of photos identified within the collection can be based on the content of the drafted message, or based on identifying information of the recipient (if it has already been entered). For example, using message 500 from FIG. 5, the sending user has identified "user" (item 504) as the recipient of message 500. This can cause the messaging engine to analyze the collection of photos using facial recognition technology in order to identify a set of images that includes a digital representation of the recipient "user" (performed as part of Step 406). In some embodiments, the text of the message can be analyzed and leveraged in order to identify a set of photos within the collection that have a similar (to at least a threshold level) context. For example, the text (item 508) of message 500 indicates that the message's context relates to the sending user's vacation last week. This indicates a specific time frame and geographical location (e.g., where the vacation was). This information can serve as a part of a query of the photo collection in order to identify photos that where taken (e.g., captured and/or downloaded/uploaded) when the sending user was on vacation. The identification of such set of photos within the collection can be based on metadata of the photos in the collection, which provides timestamps and/or positioning tags indicating when and where the photos originated.

In Step 408, the identified set of photos (from Step 406) is analyzed, and based on such analysis, a determination is made regarding identifying the "near-duplicates" within the set. As discussed above, and illustrated in FIG. 4B, "near-duplicates" are identified by the messaging engine 300 according to factors (e.g., attributes of the photos) including: i) photos that capture the same scene; and ii) subjects of the photo (e.g., the captured imagery, for example, a human depiction or other type of item's depiction within the photo) staying the same within a series of photos.

According to some embodiments, in order to identify "near-duplicates" from the set, the messaging engine 300 can implement an image classifier (in some embodiments, a learned, supervised and annotated classifier of training photos) in order to automatically analyze the photos and identify which photos correspond to "near-duplicate" content.

As illustrated in FIG. 4B, Step 408 involves the classifier implemented by the messaging engine 300 parses each photo (Step 450), identifies their attributes and determines the following features: Step 452) the time difference (e.g., in seconds or some other discernible time delta) between when a photo and its predecessor in the set were captured, downloaded, uploaded, stored, and the like; Steps 454-456) the difference between color histograms of the two photos; and/or Steps 458-460) comparing dimensional vectors of each image (Step 458).

In some embodiments, the messaging engine 300 computes the color histogram difference (Steps 454-456) between photos by averaging the histogram difference for each RGB color, computed using Hellinger distance. For example, Step 454 involves determining a color histogram for each photo in a group (or set) based on their attributes, and Step 456 involves determining a difference between each photo's histogram by averaging the histogram difference via Hellinger distance. It should be understood that any known or to be known difference computation for color schemes of a photo, as well any known or to be known color parameter (e.g., XYZ or any CIE color) can be utilized in determining differences in color schematics or parameters between two photos of the set.

According to some embodiments, the messaging engine 300 can compare the photos in the set at a more "semantic" level by inferring each photo as a representation consisting of a 4K dimensional vector (Steps 458-460). The vector representations of photos, referred to as latent vectors, are generated by the messaging engine 300 using any known or to be known deep convolutional neural network model or image classification technology, algorithm or technology similar to AlexNet. Step 458. In some embodiments, using the latent vectors of each photo, the similarity between two photos is taken as the Cosine similarity between each photo's latent vector's values. Step 460 Thus, when these latent values are at or above a threshold value, the two photos can be determined to be "near-duplicates."

In some embodiments, "near-duplicates" can be identified using any one of the methodologies identified above (Step 452), (Steps 454-456) and/or (Steps 458-460), either alone or in any type of combination with each other. For example, in order to determine "near-duplicates" between two photos, a time difference (Step 452) analysis and a latent vector (Steps 458-460) can be performed, such that upon two photos being taken within a predetermined time period and having latent values satisfying a threshold, they will be identified as "near-duplicates" of each other. In another non-limiting example, only a time difference (Step 452), or only a color histogram (Steps 454-456), or only a latent vector analysis (Step 458-460) may be performed leading to "near-duplicate" determinations. In Step 462, based on at least one of the computations discussed herein, "near-duplicates" are determined.

According to some embodiments, the latent vector analysis (Steps 458-460) can be based on a learned classifier, as mentioned above, which can be trained on a training set of photos by analyzing each photo (in some embodiments, in a human supervised manner) using a decision tree model. In some embodiments, once the classifier is trained to satisfy a threshold accuracy value, as per the supervision, it can then be implemented according to the discussion outlined above.

In Step 410, all of the photos within the set that are identified as being "near-duplicates" of each other are grouped together. For example, if the identified set of photos includes subsets of photos of a rainbow, a beach and a sky, then these subsets are grouped together by the messaging engine 300. In some embodiments, the grouping of the identified "near-duplicate" photos identified in Step 408 can be grouped according to any known or to be known image classification algorithm, technology or mechanism, for example, using a decision tree model. For example, as mentioned above, the decision tree model can group "near-duplicate" pairs having predetermined time differences (e.g., time deltas of 5 seconds or less).

In Step 412, each group of photos is then analyzed and the "highest quality" photo from each group is identified as a representative photo for each group. The "highest quality" photo is the photo that is most likely to be "shareable," as discussed above. As discussed below, the "shareability" is tied the quality of the photo, and the highest quality photo can be viewed as the photo that has the highest indication of likelihood to be shared.

According to some embodiments, for purposes of this disclosure, as understood by those of skill in the art, the term "high quality" refers to an item of digital content (e.g., a photo) satisfying a quality threshold, which can be set by a user, site administrator, artist creating/capturing the content, the system, service or platform hosting the content, the messaging engine 300 or device hosting the engine 300, or some combination thereof.

In a non-limiting example, "high-quality" or "highest quality" (used interchangeably) can refer to the digital photo being of interest to a user(s), where interest (or user engagement) can be based on: latent values of the photo (e.g., semantic tags of the photo), positional information of the photo (e.g., the location within the group—is it the first photo in the group?; is it the last?; its ordinal position from the group's start; and its position from the end), time delta features of the photo (e.g., the delta from: the previous photo in the group, the next photo in the group, the first photo in the group, and the last photo in the group), inappropriateness (e.g., mature content), and the like. In some embodiments, the quality may also include values relaying that the content is aesthetically pleasing or technically sound, in that the data associated with the content produces a resolution, focus, pixel quality, size, dimension, color scheme, exposure, white balance and the like, or some combination thereof that satisfies the quality threshold. For example, a photo's quality can be determined via implementation of a pair-wise loss function which scores the image's quality based on the image's parameters or features. In another example, an image's quality can be based on the latent values of the photo satisfying a quality threshold. In another non-limiting embodiment, the quality may also include values indicating the number of times a user has interacted with the content (e.g., viewed, shared, commented, downloaded, re-blogged, re-posted, favorited, liked, and the like) at or above the quality threshold.

In some embodiments, as understood by those of skill in the art, "high quality" can also impart a value indicating a photo's relevance, which refers to a photo satisfying a relevance threshold, which can be set by a user, site administrator, artist creating/capturing the content, the system, service or platform hosting the content, or some combination thereof. In some embodiments, relevancy can be quantified (or scored). For example, a photo's relevancy can be determined via implementation of a logistic loss function which quantifies a photo's parameters or features and ranks them according to such scoring.

Thus, according to some embodiments, the "high-quality" photos are those photos that have a value indicating a likelihood to be shared, which can be based on, but not limited to, the photo's quality values and/or relevance, as discussed immediately above.

In Step 414, each group's highest quality photo is analyzed and a "shareability" value is determined for each photo, and between each photo. As discussed above, the "shareability" of each photo is tied to the quality of each photo; therefore, the results of Step 412 can be leveraged into the determination of how "shareable" a "high quality" photo actually is. In some embodiments, the higher the photo's "quality", the higher the "shareability" value.

In some embodiments, Steps 412-414 can be combined into a single step such that the determined values of a photo's quality provide an exact indication of the photo's "shareability" value.

In Step 416, the groups of photos (created and/or identified in Step 410) are ranked based on the "shareability" value of each group's representative "high-quality" photo. Thus, the groups are ranked according to how likely a group is determined to include a shareable photo.

For example, there are three groups of photos, and each group is associated with the following content: group a) rainbow content; group b) beach content; and c) sky content (as depicted in items 510, 512 and 514, respectively, in FIG. 5). Each group's photos are analyzed and "highest quality" photo is identified for each group (as discussed above in Step 412). Then, a "shareability" score is determined for each "high-quality" photo, such that the higher the quality score of a photo, the higher the "shareability" value of the photo (as discussed above in Step 414). The "shareability" values of each photo is then leveraged in order to rank the groups represented by the photos, such that the photo having the highest "shareability" value will have its group ranked higher than those groups with representative "high quality" photos with lower "shareability" values. For example, the "shareability" value of photo 510 (e.g., rainbow photo) is greater than both the beach photo (item 512) and the sky photo (item 514), and the beach photo has a higher "shareability" value than the sky photo. As a result, the individual groups of photos will be ranked as follows, in the following order: rainbow photo group, then beach photo group, and then sky photo group (as illustrated in FIG. 5, and discussed in more detail below).

In some embodiments, the groups of photos are ranked such that an entire grouping of photos is placed higher in the ranking than another grouping of photos; and in some embodiments, only individual photos are ranked, either across groups or within a group, such that only the "highest quality" photos are ranked based on their "shareability" value. In some embodiments, the "shareability" value of a group is compared to a threshold value, such that if the "shareability" value is at or below the threshold value, it may be dropped from the ranked list/set. In some embodiments, such threshold comparison can be a product of a post-ranking filtering step that may filter out photos that are considered inadequate for sharing even if they are ranked within a top-N photo or group. This can be performed either manually or by hard-coded, computer-executable instructions embedded in the ranking module 308 of the messaging engine 300 in order to compare the "shareability" values to the threshold value.

In some embodiments, the ranking performed by the messaging engine 300 can be in accordance with a training set of data that was resultant a subset of photo uploads the engine 300 was trained upon, as discussed above. For example, engine 300 may analyze a subset of photo uploads by a single user (e.g., daily or weekly), and label each photo based on whether it was shared or not. For example, if the photo was uploaded to Flickr®, which supports private or public modes, the photo will be labeled (or tagged) as shared depending on the mode it was uploaded under (e.g., public mode upload resulting in a "public" labeling or "shared"

labeling of the photo). In another example, a photo within a mail system is labeled as shared if it was attached in an outgoing message, and non-shared otherwise.

Given the training data set, the messaging engine 300 can implement a ranker (e.g., via the ranking module 308) in order to rank photos that are likely to be shared higher than photos that are not likely to be shared by applying any known or to be known machine-learning algorithm for supervised ranking, such as, but not limited to, a linear ranking (e.g. SVMrank) or Gradient-boosted Decision Trees (GBDT).

In Step 418, a set of "highest quality" photos (or "shareable") photos that represent each group within the ranking is selected. An example of the selected set of photos can be seen in FIG. 5, items 510-514, as discussed above, illustrated in a like manner accordingly, and discussed in more detail below in relation to Steps 420-422. In some embodiments, the selection of the photos involves the messaging engine 300 automatically selecting the top-N photos from the top group. In some embodiments, the selection of the photos involves the messaging engine 300 automatically selecting the top-N photos from each of the groups, or across each group.

In Step 420, the selected set of photos (from Step 418) is automatically communicated to the user so that a selection of a photo(s) from the set can be made. In some embodiments, the communication of the selected set of photos involves causing the user interface (UI) of the communication platform to display, within an interface area or interface object of the platform UI, the set of photos (or thumbnails, as discussed above). For example, as illustrated in FIG. 5, the set of photos (items 510-514) are displayed in the message body 506 of message 500 the user is drafting. The user can select one of these photos (or a photo within the group represented by these items 510-514), and such photo can be embedded, attached or incorporated into message 500. In some embodiments, upon display of the selected set of messages, a prompt may appear (item 502) which provides the user with an indication as to the opportunity to share photos from their collection.

It should be understood that the prompt (item 502) and display of the selected set of photos (items 510-514) can be displayed anywhere within a user interface of the message 500 or within the interface of the communication platform the user is utilizing to draft the message 500. For example, the prompt (item 502) can be displayed a dialog box that alerts the user to the functionality being added to the communication platform. In another example, the select set of photos need not be displayed in the message body 504, as it can be display in a side bar or "rail", or in an associated window that enables the user to select, drag-and-drop, or otherwise identify a photo from the set for inclusion in the message. Thus, the illustrations of the items in FIG. 5 would be understood by those of skill in the art as illustrative of some embodiments, and non-limiting.

In some embodiments, the display of Step 420 can involve push technology or mechanisms (e.g., a push message) that make the capability of reviewing and selecting a photo from the selected set discoverable. In some embodiments, the "push" of the display in Step 420 can be in accordance with delivery rules—for example, a daily, monthly or periodic alert to the user based on the frequency the user messages and/or uploads or captures photos. In some embodiments, the "push" can be based on the identification that the user is drafting a message, just received a message, responding to a message, logged into his/her account, and the like.

In Step 422, the user can select a photo from the displayed photos whereby the messaging engine 300 generates an electronic communication for delivery over a network via the platform. As discussed above, the generated communication can involve attaching or including the photo into the drafted message. In some embodiments, the selection of the photo(s) can (also or alternatively) involve an indication to the messaging engine 300 that the user has identified a specific photo(s), which can trigger the engine 300 to communication (e.g., post) the selected photo(s) on other communication platforms for which the user has an account.

For example, as per the example in FIG. 5, if the user selects the rainbow photo (item 510), the photo is attached to the message 500 addressed to the recipient 504, and can be sent to that recipient. As discussed above, in some embodiments, selection of photo 510 can also trigger the engine 300 accessing other messaging accounts of the user, such that the photo 510 (and in some embodiments, at least a portion of the text 508) can be posted on the user's social media sites (as per preferences set by the user) such as, for example, Facebook®, Tumblr®, Flickr®, Twitter®, and the like. For example, the photo 510 can be posted on the user's Tumblr® page or Facebook® with the caption "Take a look at the photos I captured when on vacation" (which was derived from text 508 from message 500).

FIG. 6 is a work flow example 600 for serving relevant digital media content associated with or comprising advertisements (e.g., digital advertisement content) based on the information associated with an identified and communicated digital content item within a message, as discussed above in relation to FIGS. 3-5. Such information, referred to as "digital content item information" for reference purposes only, can include, but is not limited to, information associated with an identified digital content item (e.g., the identity of the creator of the image, the time it was created, stored, downloaded or identified, and the like, the type or format of the content item, the category of the digital content included in the content item, and the like), the message upon which the digital content item will be included, the recipient(s) of the message, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying proprietary or promotional content provided by a network associated third party.

In Step 602, digital content item information is identified. As discussed above, the digital content item information can be based any of the information from processes outlined above with respect to FIGS. 3-5. For purposes of this disclosure, Process 600 will refer to single identified digital content item as the basis for serving a digital advertisement (s); however, it should not be construed as limiting, as any number of items and/or messages, as well as programs used during identification of the digital content item, or creation or delivery of the message can form such basis, without departing from the scope of the instant disclosure.

In Step 604, a context is determined based on the identified digital content item information. This context forms a basis for serving advertisements related to the digital content item information. In some embodiments, the context can be determined by determining a type of content depicted by the digital content item. In some embodiments, the context can be based on a determined category which the digital content item information of Step 602 represents. For example, the identified digital content item can include content associated with a category corresponding to "hunting" (e.g., the picture depicts the user standing next to the buck he just tagged); therefore, the context identified in Step 604 can be related to "hunting" or other "in-season outdoors activities" and can be leveraged in order to identify digital ad content of interest, as discussed herein in relation to the steps of Process 600. In some embodiments, the identification of the context from Step 604 can occur before, during and/or after the analysis detailed above with respect to Process 400, or some combination thereof.

In Step 606, the determined context is communicated (or shared) with an advertisement platform comprising an advertisement server 130 and ad database. Upon receipt of the context, the advertisement server 130 performs (e.g., is caused to perform as per instructions received from the device executing the messaging engine 300) a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to view, draft and/or render messages or media. Step 612. In some embodiments, the selected advertisement is sent directly to the account or computing device of each user identified in the message (e.g., sender and recipient(s)). In some embodiments, the selected advertisement is displayed within a portion of the interface or within an overlaying or pop-up interface associated with the messaging interface used to create, send and receive messages.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, over a network at a messaging server associated with an electronic communication platform, input from a user associated with creation of a message to at least one recipient;

identifying, via the messaging server, a set of digital image files within a digital image file collection associated with the user, said digital image files in the collection uploaded by the user and stored in a database in association with an account of the user on said electronic communication platform;

analyzing, via the messaging server, attributes of each of the identified set of digital image files, and based on said analysis, identifying near-duplicate image files within said set of digital image files, said near-duplicate image files being at least a two image files having similar attributes at least satisfying a threshold value of similarity;

grouping, via the messaging server based on said analysis, said identified near-duplicate image files, said grouping comprising identifying each instance of said image files having similar attributes and grouping them into individual groups according to the identified similar attributes;

identifying, via the messaging server, a representative digital image file for each grouping, said identification of the representative digital image file comprising analyzing, for each group, said attributes of the image files, the attributes of each image indicating popularity information and positional information indicating an initial position among other image files within each grouping;

determining, by the messaging server, based on said analysis, a digital image file that has a highest quality value among the group, wherein for each group said representative digital image file is the determined digital image file with the highest quality value, the highest quality value based at least on the popularity information and positional information;

determining, via the messaging server, an attribute score for each group;

determining, via the messaging server, a shareability value for the representative digital image files of each group based on said attribute score for each group, said shareability values corresponding to at least the highest quality value for each representative digital image file, each shareability value providing an indication as to how likely the user is to share the representative digital image file over the network;

compiling, via the messaging server, a ranked set of groups of digital image files based on the shareability value of each representative digital image file, the ranked set of groups being ordered according to the shareability value of each group's representative digital image;

comparing values of the attributes of each of the image files in a group, and based on said comparison, determining an order of the image files; and causing to be displayed, via the messaging server, an interface object within an interface of the communication platform in association with the message, said interface object comprising a displayed, interactive depiction of the ranked set of groups of digital image files.

2. The method of claim 1, further comprising:
receiving a selection of at least one representative digital image file from said displayed interface object;
modifying said message by inserting said selected digital image file into said message; and
communicating, via the electronic communication platform, said modified message to said at least one recipient.

3. The method of claim 1, further comprising:
receiving a selection of at least one representative digital image file from said displayed interface object;
identifying at least one other communication platform that said user has an account;
generating, based on said identification, a message within said at least one other communication platform, said generated message comprising at least said selected digital image file; and
causing communication, over the network, of said generated message for display within an interface of said at least one other communication platform.

4. The method of claim 1, wherein said digital representation of each of the representative digital image files is a thumbnail image depicting digital content of each representative digital image file.

5. The method of claim 4, wherein said thumbnail image is an interactive digital image link to said database that enables the user to browse the other images in the group of the respective representative digital image file, wherein at least one other image file from the group is capable of being selected for inclusion in said message from said interface object.

6. The method of claim 1, further comprising:
identifying a subset of images within said digital image file collection, said subset comprising at least a portion of said digital images files within said collection, wherein said analysis of the identified digital images files is based on said subset.

7. The method of claim 6, wherein said subset is based on a context of said created message.

8. The method of claim 1, wherein said identification of the near-duplicate images further comprises:
compiling a latent vector for each digital image file in said identified set, each latent vector comprising values representing the attributes of a respective digital image file;
analyzing each digital image file against another digital image file in the set based on a comparison of said latent vectors of each digital image file; and
identifying said near-duplicates based on said analysis of the latent vectors.

9. The method of claim 1, wherein said identification of the near-duplicate images further comprises:
identifying a time value for each digital image file in said identified set, said time value included in said attributes of each digital image file;
determining a time difference between each digital image file in the set based on the identified time values; and
identifying said near-duplicates based on said time difference between at least a set of image pairs being at or below a threshold time value.

10. The method of claim 1, wherein said identification of the near-duplicate images further comprises:

determining a color value of each digital image file in said identified set, said color value determination based on RGB color data included in said attributes;
determining a difference between each digital image file based on the color value of each digital image file;
averaging the difference between each digital image file; and
identifying said near-duplicates based on said averaged difference.

11. The method of claim 2, further comprising:
determining a context of the selected digital image file;
causing communication, over the network, of said context to a third party content platform to obtain a digital content item comprising third party digital content associated with said context;
receiving, over the network, said digital content item; and
causing display said digital content item in association with a display of said communicated modified message within a user interface of said electronic communication platform executing on the at least one recipient's device.

12. The method of claim 1, further comprising:
determining an order of the image files based on a determination of which image file has an attribute with a highest value, wherein said highest value corresponds to said highest quality value.

13. A non-transitory computer-readable storage medium tangibly encoded with computer-executable instructions, that when executed by a processor associated with a messaging server, performs a method comprising:
receiving, over a network at the messaging server associated with an electronic communication platform, input from a user associated with creation of a message to at least one recipient;
identifying, via the messaging server, a set of digital image files within a digital image file collection associated with the user, said digital image files in the collection uploaded by the user and stored in a database in association with an account of the user on said electronic communication platform;
analyzing, via the messaging server, attributes of each of the identified set of digital image files, and based on said analysis, identifying near-duplicate image files within said set of digital image files, said near-duplicate image files being at least a two image files having similar attributes at least satisfying a threshold value of similarity;
grouping, via the messaging server based on said analysis, said identified near-duplicate image files, said grouping comprising identifying each instance of said image files having similar attributes and grouping them into individual groups according to the identified similar attributes;
identifying, via the messaging server, a representative digital image file for each grouping, said identification of the representative digital image file comprising analyzing, for each group, said attributes of the image files, the attributes of each image indicating popularity information and positional information indicating an initial position among other image files within each grouping;
determining, by the messaging server, based on said analysis, a digital image file that has a highest quality value among the group, wherein for each group said representative digital image file is the determined digital image file with the highest quality value, the highest quality value based at least on the popularity information and positional information;

determining, via the messaging server, an attribute score for each group;

determining, via the messaging server, a shareability value for the representative digital image files of each group based on said attribute score for each group, said shareability values corresponding to at least the highest quality value for each representative digital image file, each shareability value providing an indication as to how likely the user is to share the representative digital image file over the network;

compiling, via the messaging server, a ranked set of groups of digital image files based on the shareability value of each representative digital image file, the ranked set of groups being ordered according to the shareability value of each group's representative digital image;

comparing values of the attributes of each of the image files in a group, and based on said comparison, determining an order of the image files; and causing to be displayed, via the messaging server, an interface object within an interface of the communication platform in association with the message, said interface object comprising a displayed, interactive depiction of the ranked set of groups of digital image files.

14. The non-transitory computer-readable storage medium of claim 13, further comprising:

receiving a selection of at least one representative digital image file from said displayed interface object;

modifying said message by inserting said selected digital image file into said message; and communicating, via the electronic communication platform, said modified message to said at least one recipient.

15. The non-transitory computer-readable storage medium of claim 13, further comprising:

receiving a selection of at least one representative digital image file from said displayed interface object;

identifying at least one other communication platform that said user has an account;

generating, based on said identification, a message within said at least one other communication platform, said generated message comprising at least said selected digital image file; and causing communication, over the network, of said generated message for display within an interface of said at least one other communication platform.

16. The non-transitory computer-readable storage medium of claim 13, wherein said digital representation of each of the representative digital image files is a thumbnail image depicting digital content of each representative digital image file, wherein said thumbnail image is an interactive digital image link to said database that enables the user to browse the other images in the group of the respective representative digital image file, wherein at least one other image file from the group is capable of being selected for inclusion in said message from said interface object.

17. The non-transitory computer-readable storage medium of claim 13, wherein said identification of the near-duplicate images further comprises:

compiling a latent vector for each digital image file in said identified set, each latent vector comprising values representing the attributes of a respective digital image file;

analyzing each digital image file against another digital image file in the set based on a comparison of said latent vectors of each digital image file; and identifying said near-duplicates based on said analysis of the latent vectors.

18. The non-transitory computer-readable storage medium of claim 13, wherein said identification of the near-duplicate images further comprises:

identifying a time value for each digital image file in said identified set, said time value included in said attributes of each digital image file;

determining a time difference between each digital image file in the set based on the identified time values; and identifying said near-duplicates based on said time difference between at least a set of image pairs being at or below a threshold time value.

19. The non-transitory computer-readable storage medium of claim 13, wherein said identification of the near-duplicate images further comprises:

determining a color value of each digital image file in said identified set, said color value determination based on RGB color data included in said attributes;

determining a difference between each digital image file based on the color value of each digital image file;

averaging the difference between each digital image file; and identifying said near-duplicates based on said averaged difference.

20. A messaging server comprising:

a processor; and a non-transitory computer-readable storage medium for tangibly storing thereon program logic for execution by the processor, the program logic comprising:

logic executed by the processor for receiving, over a network at the messaging server associated with an electronic communication platform, input from a user associated with creation of a message to at least one recipient;

logic executed by the processor for identifying, via the messaging server, a set of digital image files within a digital image file collection associated with the user, said digital image files in the collection uploaded by the user and stored in a database in association with an account of the user on said electronic communication platform;

logic executed by the processor for analyzing, via the messaging server, attributes of each of the identified set of digital image files, and based on said analysis, identifying near-duplicate image files within said set of digital image files, said near-duplicate image files being at least a two image files having similar attributes at least satisfying a threshold value of similarity;

logic executed by the processor for grouping, via the messaging server based on said analysis, said identified near-duplicate image files, said grouping comprising identifying each instance of said image files having similar attributes and grouping them into individual groups according to the identified similar attributes;

logic executed by the processor for identifying, via the messaging server, a representative digital image file for each grouping, said identification of the representative digital image file comprising analyzing, for each group, said attributes of the image files, the attributes of each image indicating popularity information and positional information indicating an initial position among other image files within each grouping;

logic executed by the processor for determining, based on said analysis, a digital image file that has a highest quality value among the group, wherein for each group said representative digital image file is the determined digital image file with the highest quality value, the highest quality value based at least on the popularity information and positional information;

logic executed by the processor for determining, via the messaging server, an attribute score for each group;

logic executed by the processor for determining, via the messaging server, a shareability value for the representative digital image files of each group based on said attribute score for each group, said shareability values corresponding to at least the highest quality value for each representative digital image file, each shareability value providing an indication as to how likely the user is to share the representative digital image file over the network;

logic executed by the processor for compiling, via the messaging server, a ranked set of groups of digital image files based on the shareability value of each representative digital image file, the ranked set of groups being ordered according to the shareability value of each group's representative digital image;

logic executed by the processor for comparing values of the attributes of each of the image files in a group, and based on said comparison, determining an order of the image files; and logic executed by the processor for causing to be displayed, via the messaging server, an interface object within an interface of the communication platform in association with the message, said interface object comprising a displayed, interactive depiction of the ranked set of groups digital image files.

\* \* \* \* \*